Dec. 15, 1936.     E. J. MERKLE     2,064,214
APPARATUS FOR MAKING COFFEE
Filed Oct. 5, 1934
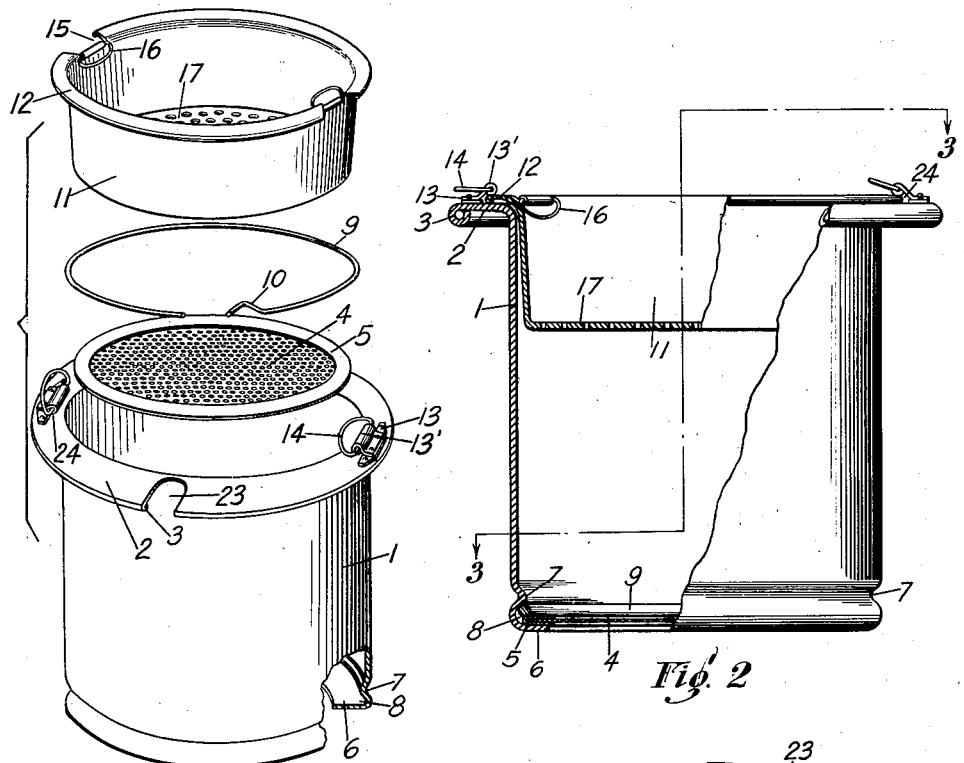
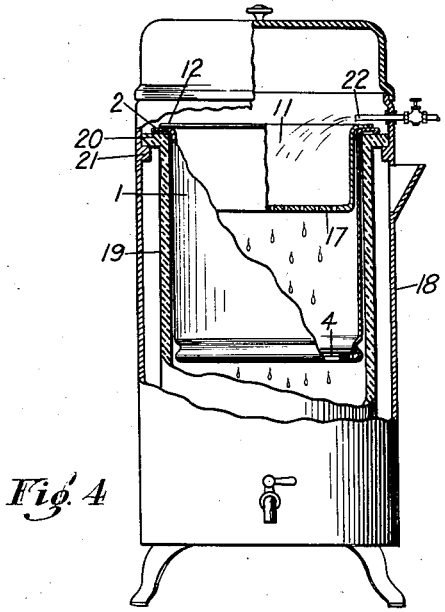
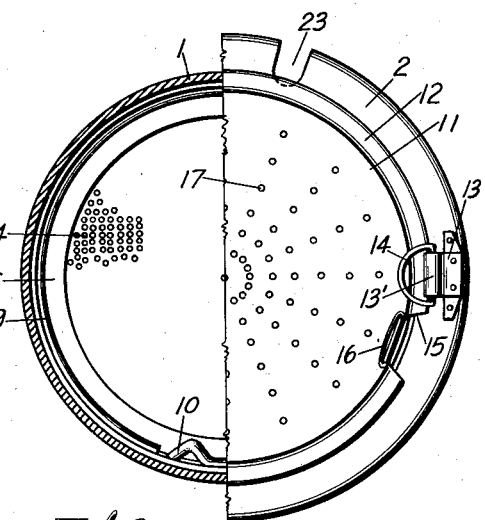
INVENTOR.
Edward J. Merkle.
BY
ATTORNEYS.

Patented Dec. 15, 1936

2,064,214

UNITED STATES PATENT OFFICE 2,064,214

APPARATUS FOR MAKING COFFEE

Edward J. Merkle, Columbus, Ohio

Application October 5, 1934, Serial No. 747,040

1 Claim. (Cl. 53—3)

My invention relates to apparatus for making coffee. My invention relates particularly to apparatus for making large quantities of coffee and is applicable to coffee urns such as are used in hotels, restaurants, and the like. However, my invention is not limited in its application to urns for making large quantities of coffee, but is applicable to smaller coffee-making vessels also.

One of the objects of my invention is to provide a coffee-making device which is of such a nature that coffee of the desired strength and flavor may be produced with only a minimum amount of ground coffee being used.

Another object of my invention is to provide a device for making coffee in which the use of cloth or paper filtering and straining means is unnecessary.

Another object of my invention is to provide a foraminous or perforated straining means which renders unnecessary the use of paper or cloth filtering means and which is mounted in the device by means which will effectively hold it in position, but which is of such a nature that the straining means may be easily and quickly removed for cleaning or other purposes.

Another object of my invention is to provide means for spreading the hot water that is passed through the ground coffee so that it will be effectively distributed throughout the ground coffee and will therefore effectively extract all the flavor and desirable oils from the ground coffee, the spreading means being mounted in such a manner that it may be readily removed.

Another object of my invention is to provide a coffee-making device which is made up of a minimum number of parts and which is of such a simple construction that it may be manufactured at a low cost.

In its preferred form my invention contemplates the provision of a device which is to hold the ground coffee and which may be fitted within the earthenware jar usually provided in large coffee-making urns. This device has a foraminous or perforated bottom which may be easily and quickly removed for cleaning or other purposes. This foraminous bottom is adapted to support the ground coffee and is of such a nature that paper or cloth filtering means need not be used. I provide a water-spreading means at the top of the container for the ground coffee and this means will cause the hot water which is passed down through the ground coffee to be distributed throughout the ground coffee and, therefore, to effectively extract the desirable matter therefrom.

A preferred embodiment of my invention is illustrated in the accompanying drawing wherein similar characters of reference designate corresponding parts and wherein:

Figure 1 is a perspective view showing the various parts of my device in spaced disassembled relation.

Figure 2 is a view partly in side elevation and partly in section illustrating my device with all parts thereof assembled.

Figure 3 is a view partly in section and partly top plan and taken substantially along line 3—3 of Figure 2.

Figure 4 is a view partly in side elevation and partly in section showing my device applied to a coffee-making urn of a type used for making large quantities of coffee.

With reference to the drawing, I have illustrated my device as comprising a container 1 which is adapted to receive the ground coffee. This container 1 is of substantially cylindrical form and is open at both its upper and lower ends. The upper end of the container 1 is provided with an outwardly projecting peripheral flange 2. This flange 2 has a bead 3 formed at its outer edge. The container 1 is preferably made of some suitable metal, such as aluminum, although it may be made of other material.

For supporting the ground coffee in position in the lower end of the container 1 so that hot water may be sprayed downwardly therethrough, I provide a foraminous or perforated straining means 4. This straining means is preferably made from a sheet of metal, such as aluminum, in which innumerable minute openings are formed. There are so many openings and they are so small that it will be unnecessary to use cloth or paper filtering means, which are undesirable because they absorb part of the flavor from the coffee and also impart a foreign taste thereto. The sheet of metal of which the strainer member 4 is composed is of disc-like form and its peripheral edge fits within an annular reinforcing member 5 which is of substantially U-shaped cross section. This member 5 grips the edge of the disc-like sheet of metal and protects the edge thereof.

In order to hold the straining member 4 in place, I provide the structure now to be described. The lower end of the container 1 is provided with an inwardly extending peripheral flange 6. The straining member 4, or more specifically, the reinforcing ring 5 thereof, will rest on the upper surface of this flange as shown in Figure 2. In order to hold the straining member on this flange, an inwardly projecting bead 7 is formed on the inner surface of the container slightly above the flange 6. This produces a groove 8 within the container, above flange 6, which receives a split expanding ring 9 made of suitable wire. When this ring is inserted in the groove 8 it expands and occupies a position beneath the bead 7 as shown in Figure 2. Therefore, it retains the straining member 4 in position. One end of the expanding ring 9 is bent as indicated at 10 in Figure 3, to facilitate removal of the ring. It will be apparent that with this structure, the straining member 4 will be securely held in place. However, the straining member may be easily and quickly removed for cleaning or other purposes merely by removing the expanding ring 9.

In order to provide means for spreading the hot water which is to be passed through the ground coffee that will be supported on the upper surface of strainer member 4, I provide a water-spreading member 11 which is disposed in the top of the container 1. This water-spreading member 11, which is also preferably made of aluminum, is of pan-like form and is slightly less in diameter than the container 1 so that it will readily fit within the upper end thereof. The spreading member 11 is provided with an outwardly projecting peripheral flange 12 which will rest on the upper surface of flange 2 of container 1 and will support the spreading member 11, in the position indicated in Figure 2, within the upper end of container 1.

It is desirable to have the spreading member 11 mounted in such a manner that it may be readily removed. However, it is also desirable to provide means to firmly hold this member 11 in position at the time the device is in use. Therefore, I provide the peripheral flange 2 of container 1 with inwardly and upwardly projecting lugs 13 at diametrically opposed points which are riveted to this flange, as shown best in Figure 1. The inner edges of lugs 13 are curled as at 13' to receive handle members 14 which are mounted therein in such a manner that they may be swung from one side to the other. These handle members serve as a means by which the container 1 may be readily lifted. The flange 12 on member 11 is notched, as indicated at 15, at diametrically opposed points. The metal at the inner edges of these notches is curled to receive handle members 16 which may be swung from one side to the other. It will be apparent that if the member 11 is properly positioned above the upper end of member 1 with notches 15 above lugs 13 and is then lowered, there will be no interference between flange 12 and lugs 13, and flange 12 will rest on flange 2. Then, if the member 11 is rotated on member 1, the flange 12 will be in the spaces 24 beneath the lugs 13. Thus, the lugs in cooperation with the flange will hold the member 11 down on member 1. When it is desired to remove member 11, it need only be rotated relative to member 1 until lugs 13 and notches 15 coincide. Then member 11 may be raised from member 1.

The spreading member 11 is of pan-like structure so that it may contain a substantial amount of water. The bottom 17 thereof is perforated to permit the water to drip therefrom. These perforations are fairly large in comparison with the perforations in straining member 4. This member 11 serves to effectively spread water which is run into it so that it will spray down through the ground coffee which will be supported on the straining member 4 and will be distributed uniformly throughout the entire mass of the ground coffee. Thus, the desirable oils and flavor will be readily extracted from the ground coffee and it will be possible to use a minimum amount of the ground coffee.

In Figure 4, I show my device applied to a coffee-making urn of the type used for making large quantities of coffee. This urn is shown as comprising an outer metal shell 18 and an inner earthenware jar 19 which receives the coffee beverage after it drops through the strainer member 4. This jar 19 is provided with a peripheral flange 20 at its upper end which rests on a ledge 21 on the metal shell 18 and supports the jar in position. At a point spaced slightly above the upper end of the jar 19 is a faucet 22 through which hot water will pass, when desired, into the member 11. When my device is in position in the urn, the member 1 will fit within the jar 19 and the flange 2 thereof will rest on the upper end of the jar and maintain it in position. The member 11 will be disposed within the upper end of member 1 as previously stated. The flange 2 of member 1 is provided with a notch 23 so that the end of the faucet 22 will not interfere with placing of the container 1 in the position indicated in Figure 4. Notches 15 in member 11, will permit positioning of this member in the position indicated in Figure 4, without interference with the end of faucet 22.

From the above description, it will be apparent that I have provided a device for making coffee having many advantageous features. This device is of such a nature that it may be cheaply manufactured. It is composed of a minimum number of parts which are so constructed that they may be easily kept clean. The straining member which I have provided in my device is of such a nature that it will not be necessary to use filtering means, such as paper or cloth, which absorb some of the flavor from the coffee and which give the coffee a foreign taste. This straining member is so mounted that it will be firmly held in position, but it may be easily and quickly removed, when desired, for cleaning or other purposes. The spreading member which I have provided for spreading the hot water is of such a nature that it will effectively spread the water so that it will be sprayed uniformly throughout the mass of the ground coffee. Since this spreading means is of pan-like structure, it can hold a large amount of water and will not run over if water is run into it faster than it can pass through the perforated bottom thereof. The spreading means may be easily mounted on the container which holds the ground coffee and may be easily removed therefrom. The entire device may be readily placed in an urn and may be readily removed therefrom.

Having thus described my invention, what I claim is:

In combination, a coffee urn having an inner receptacle which receives the coffee beverage, a container for the ground coffee, said container being of substantially cylindrical form and having an outwardly extending peripheral flange on the upper end thereof, said container having a perforated bottom, a water spreading member disposed within the upper end of said container, said spreading member being of pan-like structure and having an outwardly extending peripheral flange on the upper end thereof which rests on the peripheral flange at the upper end of the container and supports the spreading member in position within the container, said spreading member having a perforated bottom, a pair of handle members disposed at diametrically opposed points on the peripheral flange of the container, said handle members including inwardly extending lugs spaced above the peripheral flange of the container and adapted to receive therebeneath the peripheral flange on the spreading member in order to maintain the spreading member in position, the peripheral flange of the spreading member being cut away at diametrically opposed points to permit passage of said flange beneath said lugs.

EDWARD J. MERKLE.